(12) United States Patent
Park et al.

(10) Patent No.: US 11,275,293 B2
(45) Date of Patent: Mar. 15, 2022

(54) CAMERA APPARATUS

(71) Applicant: HANWHA TECHWIN CO., LTD., Seongnam-si (KR)

(72) Inventors: Mun Jun Park, Seongnam-si (KR); Ji Seok Kim, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 27 days.

(21) Appl. No.: 16/750,606

(22) Filed: Jan. 23, 2020

(65) Prior Publication Data
US 2020/0241396 A1 Jul. 30, 2020

Related U.S. Application Data

(60) Provisional application No. 62/796,723, filed on Jan. 25, 2019.

(30) Foreign Application Priority Data

May 20, 2019 (KR) .......................... 10-2019-0059122

(51) Int. Cl.
*G03B 17/56* (2021.01)
*F16M 13/02* (2006.01)
*F16M 11/08* (2006.01)

(52) U.S. Cl.
CPC .......... *G03B 17/561* (2013.01); *F16M 11/08* (2013.01); *F16M 13/027* (2013.01)

(58) Field of Classification Search
CPC ..... G03B 17/561; F16M 11/08; F16M 13/027
See application file for complete search history.

(56) References Cited

U.S. PATENT DOCUMENTS

| 2001/0022627 A1* | 9/2001 | Bernhardt | .......... G08B 13/1963 348/373 |
| 2010/0245569 A1* | 9/2010 | Hakoishi | .......... G08B 13/19632 348/143 |
| 2016/0319988 A1* | 11/2016 | Mathews | ............. F16M 13/027 |
| 2019/0227414 A1* | 7/2019 | Umphries | .............. F16M 13/00 |

FOREIGN PATENT DOCUMENTS

| CN | 201314998 Y | 9/2009 |
| KR | 10-0732730 B1 | 6/2007 |
| KR | 101031631 B1 | 4/2011 |
| KR | 10-1321444 B1 | 10/2013 |
| KR | 10-1698468 B1 | 2/2017 |
| KR | 101729655 B1 | 5/2017 |
| WO | 03/005847 A1 | 1/2003 |

* cited by examiner

Primary Examiner — Minh Q Phan
(74) Attorney, Agent, or Firm — Sughrue Mion, PLLC

(57) ABSTRACT

A camera apparatus includes: a main body, on which a camera is mounted, wherein the camera is operated according to a signal applied from the outside, is configured to change a surveillance area by rotating in vertical and horizontal directions, and capture an image of the surveillance area; an attachment coupled to the main body, and configured to connect an external device to the main body; and a hanger in which a hole is formed, the hanger being connected to the main body for coupling the main body with the external device and decoupling the main body from the external device, wherein the attachment shares a center with the main body and is positioned at a center of the main body, and wherein the hanger is apart from the center of the main body by a certain distance and is connected to a side surface of the main body.

20 Claims, 8 Drawing Sheets

_____

CAMERA APPARATUS

CROSS-REFERENCE TO THE RELATED APPLICATIONS

This application is based on and claims priority from U.S. Provisional Application No. 62/796,723, filed on Jan. 25, 2019 in the U.S. Patent and Trademark Office, and Korean Patent Application No. 10-2019-0059122, filed on May 20, 2019, in the Korean Intellectual Property Office, the disclosures of which are incorporated herein in their entirety by reference.

BACKGROUND

1. Field

One or more embodiments relate to a camera apparatus, and more particularly, to a camera apparatus in which a main body, in which a camera is mounted, and a plate may be easily detached from each other and in which the risk of the camera apparatus being dropped and damage to the camera during replacement of the camera may be prevented.

2. Description of Related Art

A closed circuit television (CCTV) refers to a system that obtains images by capturing images of a certain place by using a modular camera and transmits the obtained images to a certain receiver.

The CCTV includes a modular camera installed in a specific place and a computer device that remotely receives information about an image from the modular camera through a wired or wireless network via a monitor, and the modular camera is installed on roads or alleys as well as in an office, a house, a hospital, etc. requiring security and is mainly used for security.

When coupling a modular camera to a housing fixed in an installation area to be photographed, a coupling method using a pin, a fixing method using a screw, or a coupling method using a magnet are available.

When a user replaces the modular camera by decoupling the same from the housing, the user must release fastening members that couple the modular camera to the housing, and when coupling is done using a magnet, since the magnetic force generated by the magnet is strong, it is difficult to decouple and remove the modular camera from the housing.

In addition, when removing the modular camera from the housing, a momentary force must be applied to the modular camera in a direction away from the housing, and thus, if the user drops the camera, there is a risk that the modular camera may be dropped and be damaged. Also, a safety wire connecting the modular camera to the housing, a connection structure for connecting the safety wire or the like are additionally required, making a complicated structure.

SUMMARY

One or more embodiments include a camera apparatus in which a main body, in which a camera is mounted, and a plate may be easily detached from each other, to thereby make it easier to install and replace the camera.

One or more embodiments include a camera apparatus, in which a hanger connected to a main body, in which a camera is mounted, is connected to a user, to thereby prevent the risk of the camera being dropped and damaged when the main body is removed from the plate.

However, the above objectives are exemplary, and the scope is not limited by the above objectives.

Additional aspects will be set forth in part in the description which follows and, in part, will be apparent from the description, or may be learned by practice of the presented embodiments.

According to one or more embodiments, there is provided a camera apparatus which may include: a main body, on which a camera is mounted, wherein the camera is operated according to a signal applied from the outside, is configured to change a surveillance area by rotating in vertical and horizontal directions, and capture an image of the surveillance area; an attachment coupled to the main body, and configured to connect an external device to the main body; and a hanger in which a hole is formed, the hanger being connected to the main body for coupling the main body with the external device and decoupling the main body from the external device, wherein the attachment shares a center with the main body and is positioned at a center of the main body, and wherein the hanger is apart from the center of the main body by a certain distance and is connected to a side surface of the main body.

A through hole may be formed on the side surface of the main body, and the hanger may pass through the through hole to be connected to the main body.

A protrusion may protrude from an inner surface of the main body at an inner side of the side surface of the main body, toward the hole formed in the hanger, wherein the through hole is formed on the side surface of the main body.

The protrusion may include: a protruding main body positioned inside the main body and extending in one direction; and a bent that is connected to one end of the protruding main body at a certain angle with an extension direction of the protruding main body.

The external device may include a plate fixed in position outside and coupled to the main body, wherein the attachment includes a first attachment member positioned on a surface of the main body facing the plate and a second attachment member positioned at a surface of the plate facing the first attachment member.

The first attachment member and the second attachment member may be coupled to each other via a magnetic force.

The first attachment member and the second attachment member may be coupled to each other via a Velcro method.

The first attachment member may be positioned at a center portion of the surface of the main body, and the second attachment member may be located in a center portion of the plate to correspond to a position of the first attachment member.

The camera apparatus may further include a cover that covers the other end of the main body facing one end of the main body and is coupled to the plate, wherein the main body is coupled to the plate.

The camera may have a dome shape.

According to one or more embodiments, there is provided a camera apparatus which may include: a main body, on which a camera is mounted, wherein the camera has a dome shape, and is configured to rotate about its own axis in the camera apparatus to capture an image of a surveillance area; an attachment coupled to the main body, and configured to connect an external device to the main body; and a hanger in which a hole is formed, the hanger being connected to the main body for coupling the main body with the external device and decoupling the main body from the external device.

The attachment may connect the main body to the external device by using a magnetic force or a Velcro method.

The camera apparatus may further include the external device that is configured to be fixed on a ceiling.

The hanger may include a first portion and a second positioned inside and outside the main body, respectively.

In addition to the aforesaid details, other aspects, features, and advantages will be clarified from the following drawings, claims, and detailed description.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
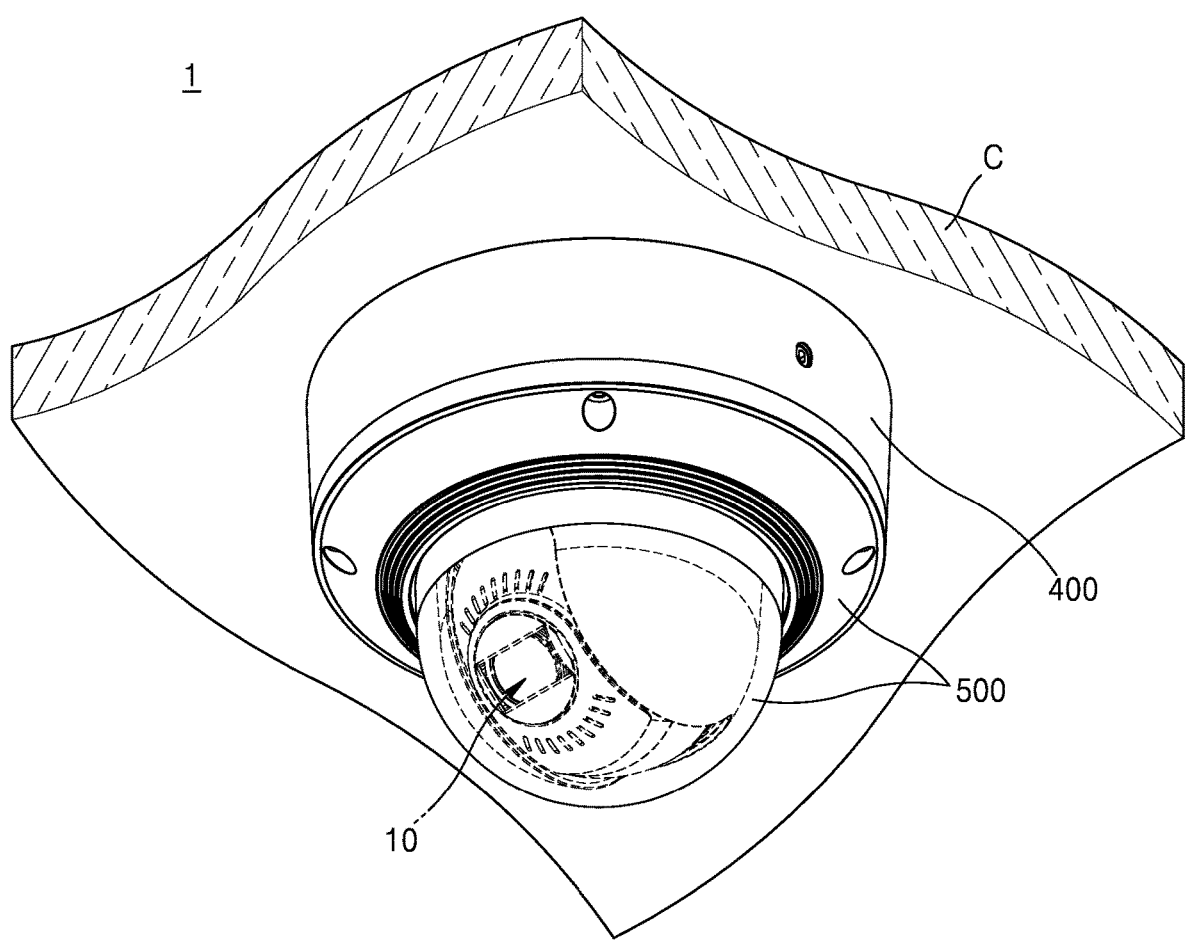
FIG. 1 is a bottom perspective view of a state in which a camera apparatus according to an embodiment is installed to an external ceiling.

Reference will now be made in detail to embodiments which are illustrated in the accompanying drawings, wherein like reference numerals refer to like elements throughout. It is noted here that all of the embodiments described herein are exemplary. In this regard, the present embodiments may have different forms and should not be construed as being limited to the descriptions set forth herein. Accordingly, the embodiments are merely described below, by referring to the figures, to explain aspects of the inventive concept. As used herein, the term "and/or" includes any and all combinations of one or more of the associated listed items. Expressions such as "at least one of," when preceding a list of elements, modify the entire list of elements and do not modify the individual elements of the list.

It will be understood that although the terms "first," "second," etc. may be used herein to describe various elements, these elements should not be limited by these terms. These terms are only used to distinguish one element from another.

As used herein, the singular forms "a," "an," and "the" are intended to include the plural forms as well, unless the context clearly indicates otherwise.

It will be understood that terms such as "comprise," "include," and "have" used herein specify the presence of stated features or elements, but do not preclude the presence or addition of one or more other features or elements.

Sizes of components in the drawings may be exaggerated for convenience of description. For example, since the sizes and thicknesses of elements in the drawings are arbitrarily illustrated for convenience of description, the inventive concept is not limited thereto.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present.

Spatially relative terms, such as "beneath," "below," "lower," "under," "on," "over," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Hereinafter, a camera apparatus according to embodiments of the inventive concept will be described with reference to the accompanying drawings.

Figure 2:
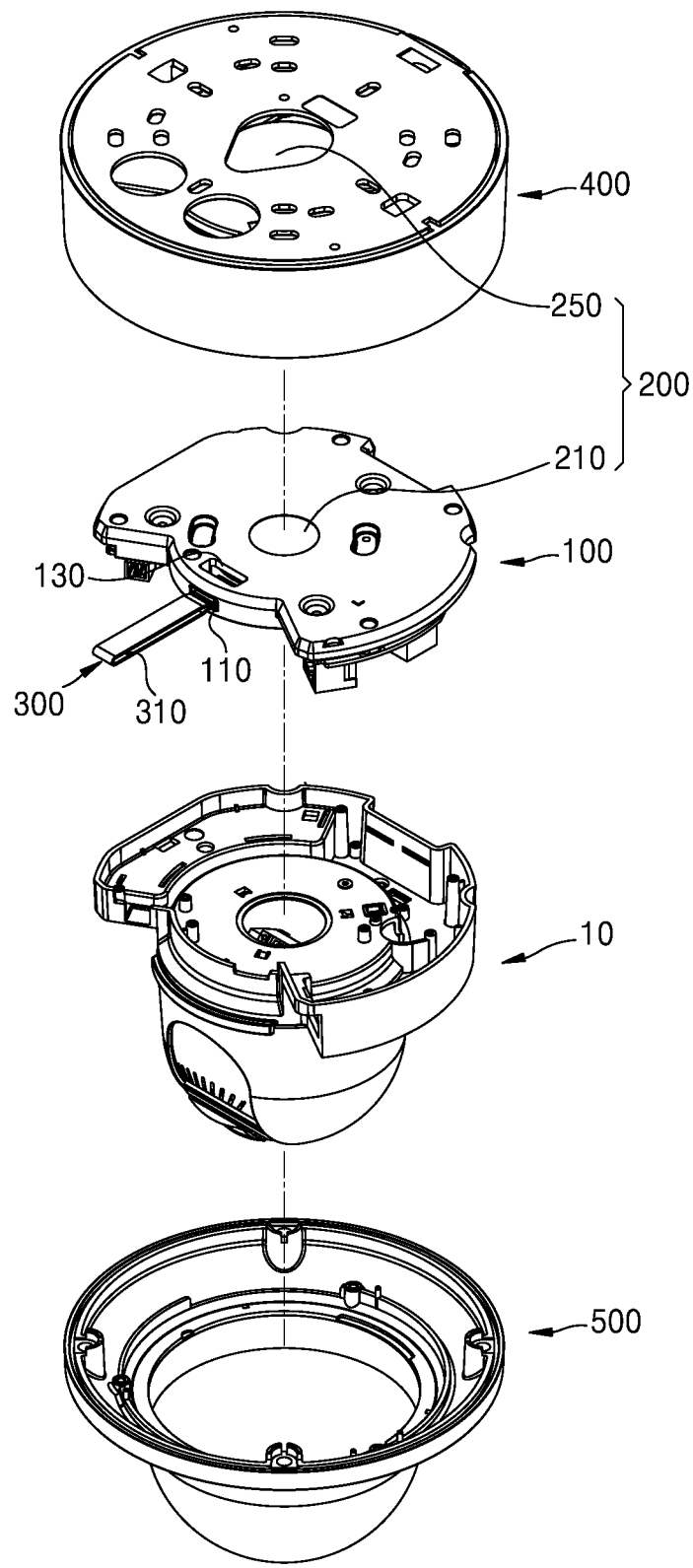
FIG. 2 is a disassembled perspective view of the camera apparatus according to an embodiment.
Figure 3:
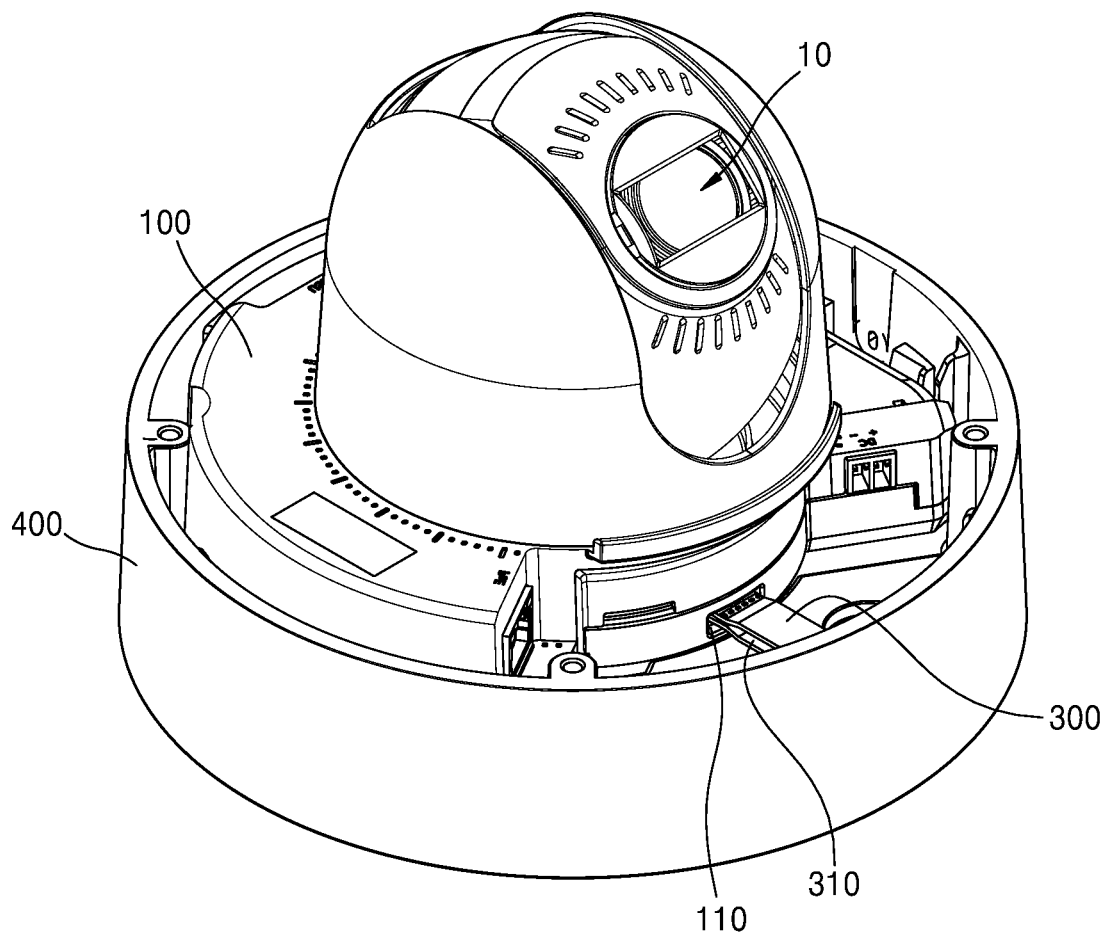
FIG. 3 illustrates a state in which a main body is coupled to a plate, according to an embodiment.
Figure 4:
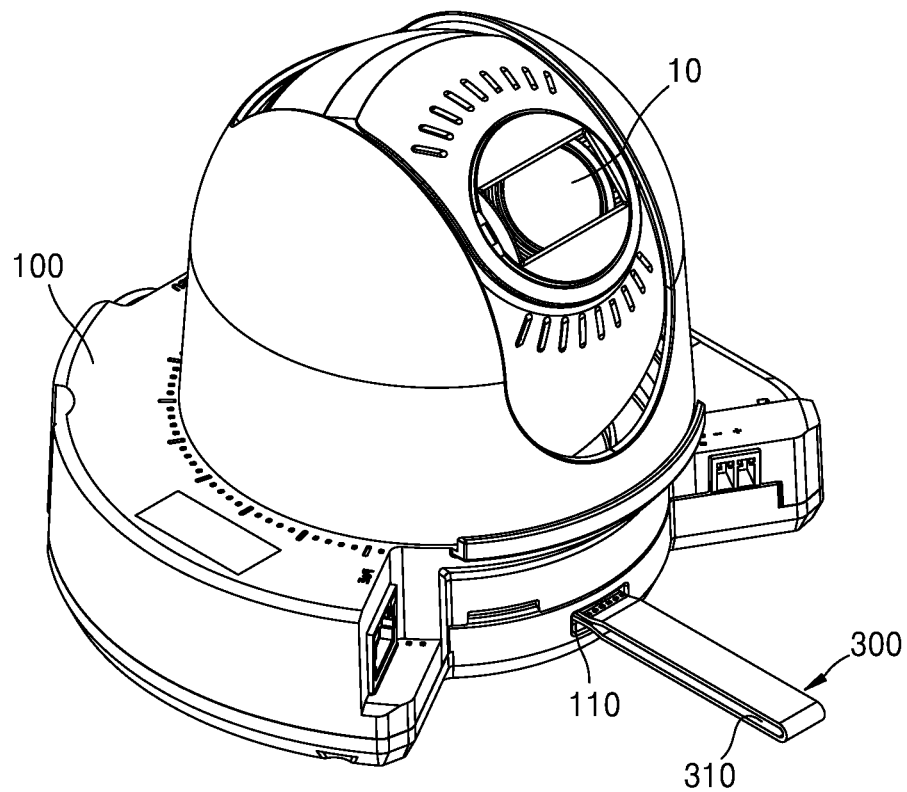
FIGS. 4 and 5 are perspective views illustrating a state in which a camera is coupled to the main body, according to an embodiment.
Figure 5:
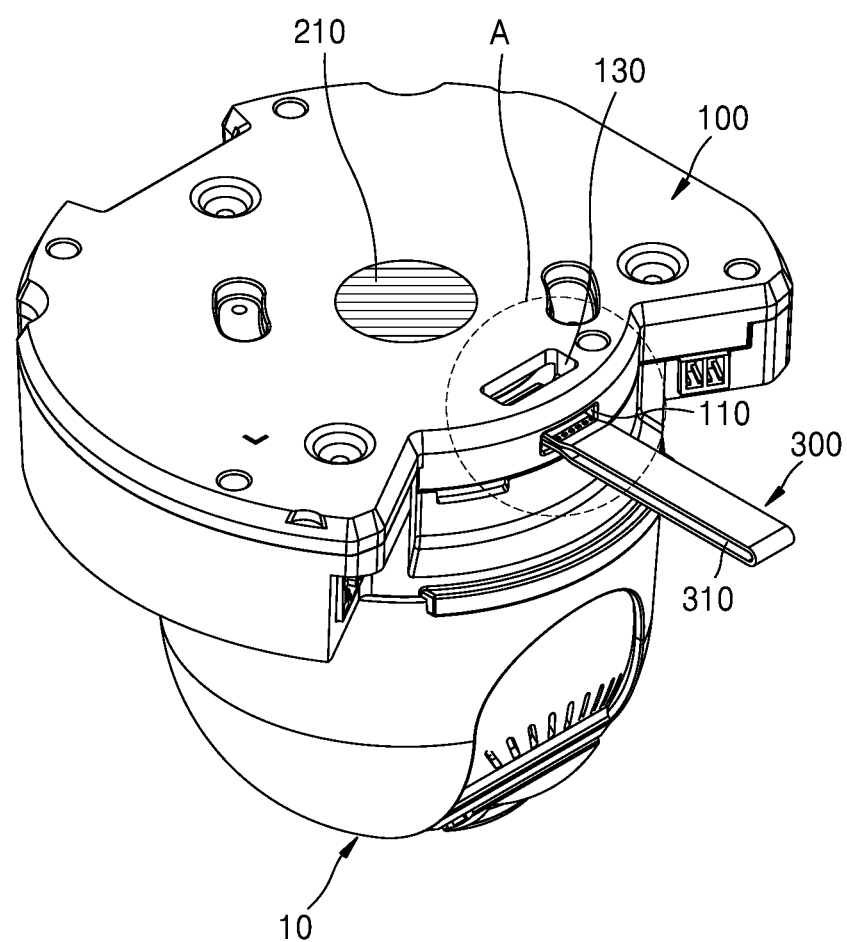
Figure 6:
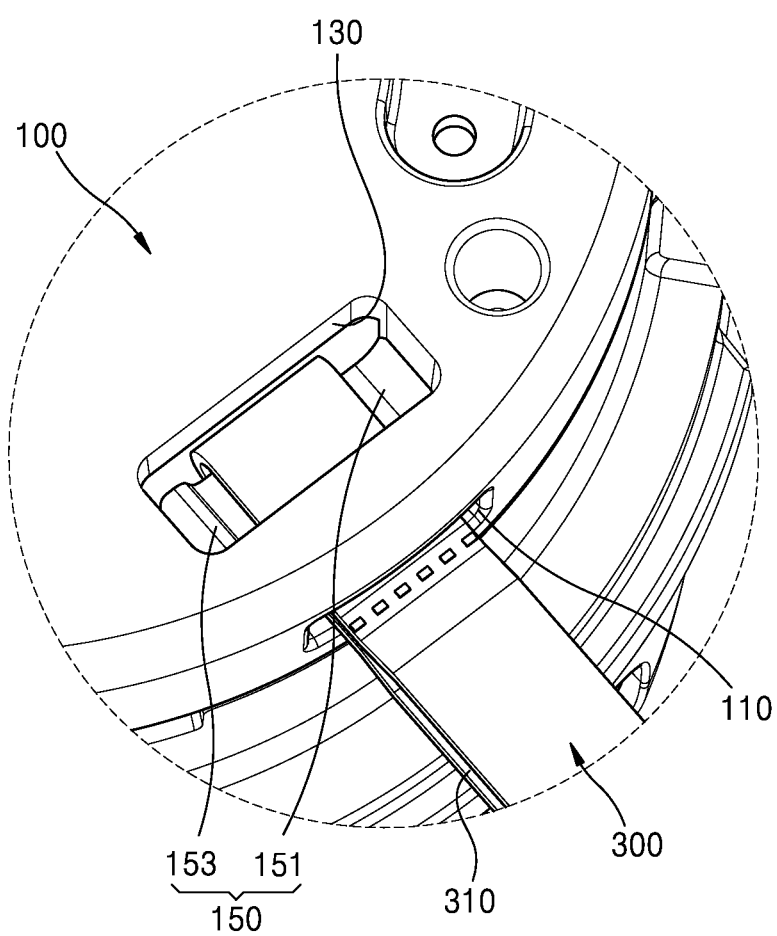
FIG. 6 is an enlarged view of region A of FIG. 5.
Figure 7:
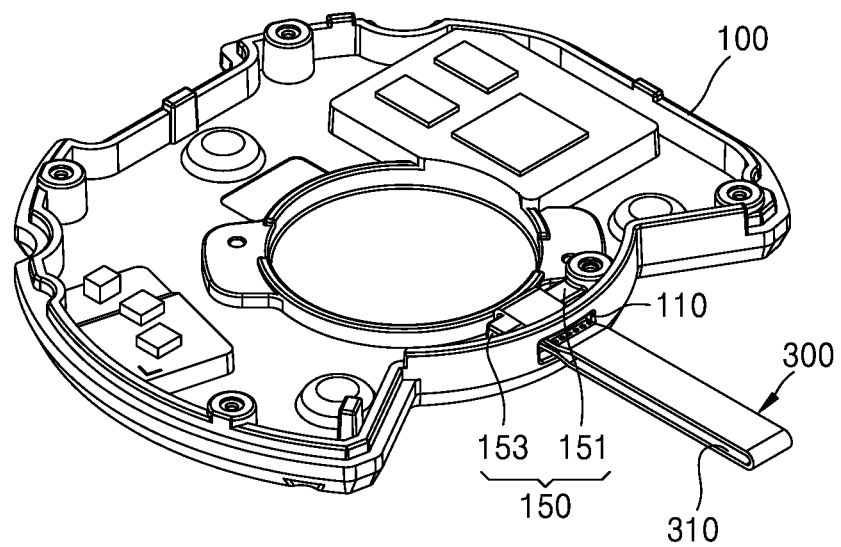
FIG. 7 is a perspective view of a state in which the main body is coupled to a hanger, according to an embodiment.
Figure 8:
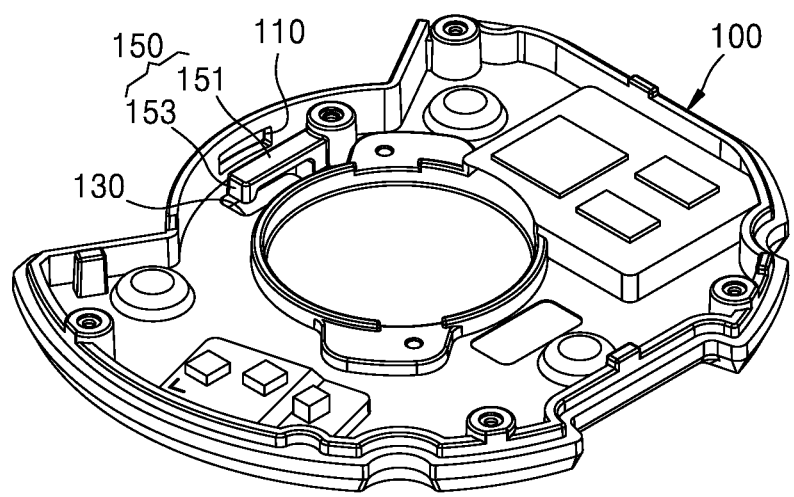
FIG. 8 is a perspective view of a state in which the main body that is decoupled from the hanger, according to an embodiment.

FIG. 1 is a bottom perspective view of a state in which a camera apparatus according to an embodiment is installed on an external ceiling. FIG. 2 is a disassembled perspective view of a camera apparatus according to an embodiment. FIG. 3 illustrates a state in which a main body is coupled to a plate, according to an embodiment. FIGS. 4 and 5 are perspective views illustrating a state in which a camera is coupled to the main body, according to an embodiment. FIG. 6 is an enlarged view of region A of FIG. 5. FIG. 7 is a perspective view of a state in which the main body is coupled to a hanger, according to an embodiment. FIG. 8 is a perspective view of a state in which the main body is decoupled from the hanger, according to an embodiment.

Referring to FIGS. 1 through 8, a camera apparatus 1 according to an embodiment may include a main body 100, an attachment 200, a hanger 300, a plate 400, and a cover 500.

Referring to FIGS. 2, 3 through 5, and 7, the main body 100 according to an embodiment is where a camera 10 is mounted, and the camera0 may have a dome shape.

The camera 10 may obtain an image about an area where the camera apparatus 1 is installed. The camera 10 operates according to a signal applied from the outside and changes its surveillance area by rotating in vertical and horizontal directions and is capable of capturing images of the surveillance area.

The camera 10 according to an embodiment may include a lens, an imaging sensor, and an image processor. The lens (reference numeral not designated) may receive image information therethrough. The imaging sensor (reference numeral not designated) may convert the received image information into an electrical signal, and the image processor (not shown) may generate image data by processing the signal generated by the imaging sensor.

The lens according to an embodiment may rotate about its own axis in the camera 10, thereby producing an effect of flexibly adjusting a photographable area.

Although not illustrated in the drawings, the camera 10 may further include a driving unit generating rotational movement in vertical and horizontal directions to change a surveillance area and a controller supplying power and controlling operation of the camera 10 by communicating with the outside.

The other details related to the configuration of the camera 10 mounted on the main body 100 corresponds to well-known technology in the art, and thus, related detailed description will be omitted.

Referring to FIGS. 2 and 4 through 8, a through hole 110 may be formed at a side surface of the main body 100 according to an embodiment, and the hanger 300 to be described later may pass through the through hole 110 to be connected to the main body 100.

Referring to FIGS. 2, 5, and 6, a bottom surface hole 130 may be formed in a bottom surface (top surface in FIG. 5) of the main body 100, connected to the side surface of the main body 100, in which the through hole 110 is formed.

As the bottom surface hole 130 is formed in the bottom surface of the main body 100 (top surface in FIG. 5), when hanging the hanger 300, which has passed through the through hole 110, on a protrusion 150 to be described later, the visibility for a user to easily hang the same may be provided.

Referring to FIGS. 5 through 8, in the main body 100, the protrusion 150 may protrude, from an inner surface of the main body 100, at an inner side of the side surface of the main body 100, in which the through hole 110 is formed, such that the protrusion 150 passes through a hole 310 formed in the hanger 300.

That is, referring to FIGS. 6 and 7, the protrusion 150 may protrude, from the inner surface of the main body 100, at the inner side of the side surface of the main body 100 facing the hanger 300 that has passed through the through hole 110 formed at the side surface of the main body 100, in a direction toward the hole 310 formed in the hanger 300.

Referring to FIGS. 6 and 8, the protrusion 150 according to an embodiment may include a protruding main body 151 and a bent portion 153, and the protruding main body 151 may be located in the main body 100 and extend in one direction.

Referring to FIGS. 6 and 8, the protruding main body 151 protrudes toward the hanger 300 that passes through the through hole 110 formed in the main body 100, to be located inside the main body 100, specifically, toward the hole 310 formed in the hanger 300, and has a certain length to pass through the hole 310 formed at the hanger 300.

Referring to FIGS. 6 and 8, the bent portion 153 may be connected to an end of the protruding main body 151 at a certain angle with respect to an extension direction of the protruding main body 151.

In detail, the bent portion 153 may be connected to the other end of the protruding main body 151 facing one end of the protruding main body 151 facing the inner side of the side surface of the main body 100.

While the bent portion 153 is perpendicular to the extension direction of the protruding main body 151, the bent portion 153 is not limited thereto, and various other modifications may be made. For example, the bent portion 153 may be at an acute angle with the protruding main body 151 within the inventive scope, in which the bent portion 153 is on a movement path of the hanger 300 that moves on the protruding main body 151 to thereby prevent the hanger 300 from detaching from the protruding main body 151.

Referring to FIGS. 6 through 8, the protrusion 150 may be independently formed of the main body 100 as a separate object and coupled thereto or may be formed as a single body therewith.

Also, various modifications may be made such that the protrusion 150, specifically, the protruding main body 151 and the bent portion 153, are also independently formed of each other as separate objects and coupled to each other or are formed as a single body.

Referring to FIGS. 2 and 5, the attachment 200 is coupled to the main body 100 and may be attached to an external device. The attachment 200 may include a first attachment member 210 and a second attachment member 250.

In the present specification, an 'external device' is coupled to the main body 100 on which the camera 10 is mounted, and may be, for example, the plate 400 to be described later. The plate 400 may be fixed in position on the external ceiling C on which the camera apparatus 1 is installed.

At least one plate hole (not shown) may be formed on a surface of the plate 400 facing the camera 10 according to an embodiment.

Accordingly, a cable (not shown) that is electrically communicable with the outside and a wire (not shown) via which electricity is supplied from the outside may pass through a plate hole to pass through the plate 400, and the cable or the wire may be electrically connected to the camera 10.

The first attachment member 210 according to an embodiment may be formed on a surface of the main body 100 (top surface in FIG. 1) facing the plate 400 to be described later. The second attachment member 250 may be formed on a surface of the plate 400 (bottom surface in FIG. 2) facing the first attachment member 210.

The attachment 200, specifically, the first attachment member 210 and the second attachment member 250, may be coupled to each other via magnetic force by using a magnet coupling method.

As the first attachment member 210 at the main body 100 and the second attachment member 250 at the plate 400 connected to the external ceiling C are coupled to each other via a magnetic force, the main body 100 may be prevented from being detached from the plate 400 and dropped, and the camera 10 coupled to the main body 100 may capture images of a space, such as an office, from various angles.

The attachment 200, specifically, the first attachment member 210 and the second attachment member 250, are coupled to each other via a magnetic force, but are not limited thereto, and various other modifications may also be made. According to another embodiment, the first attachment member 210 and the second attachment member 250 may be coupled to each other using a Velcro method.

Although not illustrated in the drawings, in the case that the first attachment member 210 and the second attachment member 250 are coupled to each other using a Velcro method, at least one hook is formed on each of the respective facing surfaces of the first attachment member 210 and the second attachment member 250 so that the first attachment member 210 and the second attachment member 250 catch and are coupled to each other.

The sizes of the hooks respectively formed on the first attachment member 210 and the second attachment member 250 may be different from each other so that the hooks may catch each other. The hooks formed on the first attachment member 210 and the second attachment member 250 may have a certain curvature of radius and may be horizontally symmetrical.

Referring to FIG. 2, the first attachment member 210 and the second attachment member 250 are respectively coupled to respective facing surfaces of the main body 100 and the plate 400, and as the first attachment member 210 and the second attachment member 250 are coupled to each other, detaching of the main body 100 from the plate 400 connected to the external ceiling C, due to gravity, and thus, dropping of the main body 100 may be prevented.

Referring to FIG. 2, the attachment 200 according to an embodiment, specifically, the first attachment member 210, may be located at a center of the surface the main body 100 (top surface in FIG. 2), and the second attachment member 250 may be located at a center of the plate 400 to correspond to a position of the first attachment member 210.

Accordingly, when a user pulls the hanger 300 that passes through the through hole 110 to be coupled to the main body 100 wherein the through hole 110 is formed in the side surface of the main body 100 that is apart by a preset distance from the center of the main body 100 where the main body 100 is coupled to the plate 400, the main body 100 may be easily decoupled from the plate 400.

Referring to FIGS. 2 through 8, the hanger 300 including the hole 310 is formed and may be connected to the main body 100.

Referring to FIG. 3, the hanger 300 may be formed of a flexible material such as fabric, silicon, or rubber.

Accordingly, the hanger 300 may be shape-deformable and foldable, and thus, may be folded in a state coupled to the main body 100 and stored within the plate 400, thereby increasing space usability.

Referring to FIGS. 4, 5, and 7, the hanger 300 may be in a ring shape forming a closed loop, and the hole 310 may be formed in the hanger 300. The hanger 300 may pass through the through hole 110 formed at the side surface of the main body 100 such that a portion of the hanger 300 is positioned inside the main body 100.

Referring to FIG. 7, the other portion of the hanger 300 may be positioned outside the main body 100. The portion of the hanger 300 positioned at the inner side of the main body 100 by passing through the through hole 110 may be engaged with the protrusion 150, specifically, on the protruding main body 151.

Referring to FIG. 7 again, the protrusion 150 protruding from the inner surface of the main body 100 at the inner side of the side surface of the main body 100 toward the hanger 300, specifically, the protruding main body 151, passes through the hole 310 formed in the hanger 300 positioned inside the main body 100. Accordingly, detaching of the hanger 300 from the main body 100 may be prevented.

Furthermore, when a user removes the main body 100 where the camera 10 is mounted, from the plate 400, the user may put a finger in the hole 310 formed in the hanger 300 and pull the main body 100 downwards (with respect to FIG. 2) to thereby separate the main body 100 from the plate 400.

In addition, as the finger of the user is put in the hole 310 formed in the hanger 300 and engaged therewith, when decoupling the main body 100 in which the camera 10 is mounted, from the plate 400 fixed in position on the external ceiling C, to replace the camera 10, the fall of the main body 100 due to gravity may be prevented.

That is, there is no need to connect the main body 100 to the plate 400 by using a safety wire or the like as an additional safety device to prevent the falling of the main body 100 downwards (with respect to FIG. 1) as the main body 100 is separated from the plate 400 in the case that there is no hanger 300, and thus, the convenience in installation and replacement of the camera 10 may be improved.

Referring to FIGS. 2 and 3, the plate 400 is fixed in position on the external ceiling C and may be coupled to the main body 100. Referring to FIG. 2, the attachment 200, specifically, the second attachment member 250, may be coupled to the plate 400.

As described above, the second attachment member 250 may be coupled to a center of a surface of the plate 400 (bottom surface in FIG. 2) facing the main body 100, and may be coupled to the first attachment member 210 coupled to the center of the surface of the main body 100 (top surface in FIG. 2) facing the surface of the plate 400.

As the attachment 200, specifically, the first attachment member 210 and the second attachment member 250, are coupled to each other, the main body 100 is coupled to the plate 400, and when replacing the camera 10, the fall of the main body 100 downward (with respect to FIG. 2) due to gravity and damage thereto when the main body 100 is decoupled from the plate 400 may be prevented.

Referring to FIGS. 1 and 2, the cover 500 covers the other end of the main body 100 opposite to one end of the main body 100 coupled to the plate 400, and may be coupled to the plate 400.

The cover 500 may have an outer circumferential surface that is in a dome shape to correspond to a shape of the camera 10. The cover 500 and the plate 400 may be coupled to each other via a screwable fastening member (not shown) such as a bolt.

Referring to FIG. 1, the cover 500 may have a certain transparent area corresponding to the camera 10. Accordingly, the camera 10 installed in the main body 100 may capture an image of an external area of the camera apparatus 1 to obtain images.

As the cover 500 covers the camera 10, contact between the camera 10 and external foreign substances may be prevented, and damage to the camera 10 due to foreign substances may be prevented.

The operating principle and effect of the camera apparatus 1 as described above will now be described.

Referring to FIGS. 1 through 8, the camera apparatus 1 may include the main body 100, the attachment 200, the hanger 300, the plate 400, and the cover 500.

Referring to FIGS. 1 and 2, the plate 400 may be fixed in position on the external ceiling C.

The main body 100 where the camera 10 is mounted is coupled to the plate 400, and by capturing an image of an area below (with respect to FIG. 1), an image of that may be obtained.

Referring to FIGS. 2 through 8, the main body 100 on which the camera 10 is mounted may be coupled to the plate 400. The attachment 200 may be located between the main body 100 and the plate 400.

The attachment 200 is coupled to the main body 100 and may be attached to an external device such as the plate 400.

The attachment 200 includes the first attachment member 210 and the second attachment member 250, and the first attachment member 210 may be coupled to the surface of the main body 100 (the top surface in FIG. 2) facing the plate 400, and the second attachment member 250 may be coupled to the surface of the plate 400 (bottom surface in FIG. 2) facing the main body 100.

Referring to FIG. 2, a user fixes the plate 400 on the external ceiling C in position to install the camera apparatus 1 in an installation area such as the external ceiling C.

Although not illustrated in the drawings, the plate 400 accommodates a certain portion of the main body 100, and as a fastening member such as a screw may pass through the plate 400 to be coupled to the external ceiling C, the plate 400 may be fixed in position on the external ceiling C.

According to the present embodiment, the attachment 200, specifically, the first attachment member 210 and the second attachment member 250, are coupled to each other via a magnetic force, and accordingly, the main body 100 where the camera 10 is installed may be fixed in position on the plate 400.

According to the present embodiment, the attachment 200, specifically, the first attachment member 210 and the second attachment member 250, are coupled to each other via a magnetic force, but are not limited thereto, and various modifications may be made. For example, they may be coupled using a Velcro method.

The attachment 200, specifically, the first attachment member 210 and the second attachment member 250, may be respectively coupled to the center of the surface of the main body 100 (top surface in FIG. 2) and the center of the surface of the plate 400 (bottom surface in FIG. 2).

Accordingly, centers of coupling areas of the main body 100 and the plate 400 may correspond to each other, and the main body 100 may be stably coupled to the plate 400, thereby preventing detachment of the main body 100 from the plate 400 and the dropping thereof.

Furthermore, the attachment 200, specifically, the first attachment member 210 and the second attachment member 250, are coupled to the center portions of the surface of the main body 100 (top surface in FIG. 2) and the center portion of the surface of the plate 400 (bottom surface in FIG. 2) to enable a user to hold the hanger 300 that is positioned outside and apart by a distance from the center portion of the main body 100 and pull the main body 100 away from the plate 400 to thereby allow the user to easily decouple the main body 100 from the plate 400.

Referring to FIGS. 2 and 4 through 8, the through hole 110 may be formed at the side surface of the main body 100, specifically, at an external side spaced apart from the center portion of the main body 100, to which the first attachment member 210 is coupled, and a certain portion of the hanger 300 passes through the through hole 110 to be positioned inside the main body 100.

Referring to FIGS. 5 through 8, in the main body 100, the protrusion 150 may protrude toward the hole 310 formed in the hanger 300. The protrusion 150 may include the protruding main body 151 and the bent portion 153.

A user may identify a position of the hanger 300 located in the main body 100 through the bottom surface hole 130 formed on the surface of the main body 100 (top surface in FIG. 5), with the naked eyes, and may have sufficient visibility to ensure that the hanger 300 is engaged with the protrusion 150, specifically, the protruding main body 151.

Referring to FIGS. 6 and 7, the protruding main body 151 protruding from the inner surface of the main body 100, toward the hole 310 formed in the hanger 300, passes through the hole 310 formed in the hanger 300, and the hanger 300 is engaged with the protruding main body 151.

Referring to FIG. 6, at the other end of the protruding main body 151 facing the one end of the protruding main body 151 coupled to the inner surface of the main body 100, the bent portion 153 that is at a certain angle with a lengthwise axis of the protruding main body 151 may be coupled.

According to the present embodiment, a lengthwise axis of the bent portion 153 and the lengthwise axis of the protruding main body 151 may be perpendicular to each other.

However, the inventive concept is not limited thereto, and other various modifications may also made. For example, the lengthwise axis of the bent portion 153 and the lengthwise axis of the protruding main body 151 may be at an acute angle with each other within the inventive scope preventing detachment of the hanger 300 from the protruding main body 151 while moving along the lengthwise axis of the protruding main body 151.

As the bent portion 153 protrudes from the protruding main body 151 toward the outside at a certain angle, the hanger 300 may be prevented from detaching from the protrusion 150, specifically, from the protruding main body 151, and the coupling force with respect to the main body 100 may be increased.

Referring to FIGS. 2 through 6, the hanger 300 may have a ring shape of a closed loop to form the hole 310 in an inner portion thereof.

Accordingly, a user may put a finger or wrist in the hole 310 formed in the hanger 300, and after decoupling the main body 100 from the plate 400, the main body 100 where the camera 10 is mounted may be prevented from being dropped and damage thereto due to the dropping may be prevented.

Furthermore, as the hole 310 is formed in the hanger 300, the hanger 300 may be engaged with the protrusion 150 protruding from the inner surface of the main body 100 even without an additional fastening member, and may be coupled to the main body 100, thereby simplifying the structure of the camera apparatus 1.

Referring to FIGS. 1, 3, and 4, as the hanger 300 is coupled to the main body 100, when decoupling the main body 100 where the camera 10 is mounted, from the plate 400 fixed to the external ceiling C, the main body 100 may be safely decoupled from the plate 400 without the need for connecting equipment such as an additional safety wire to each of the main body 100 and the plate 400.

That is, as the hanger 300 is still hung on a hand of the user, even when the user decouples the main body 100 from the plate 400, the main body 100 may be prevented from falling to the ground (lower side in FIG. 1) and being damaged.

Referring to FIGS. 1 and 2, the cover 500 is coupled to the plate 400, and as a certain area of the cover 500 corresponding to the camera 10 installed in the main body 100 is transparent, it may help the camera 10 ensure that images of the outside are obtained and prevent damage to the camera 10 due to external foreign substances.

After coupling the main body 100 where the camera 10 is mounted, with the plate 400, the user may finally couple the cover 500 with the plate 400, to thereby complete installation of the camera apparatus 1.

When regular inspection of the camera apparatus 1 or replacement of the camera 10 is required, the user may separate the cover 500 from the plate 400, and then hang the hanger 300 on the hand and pull the main body 100 away from the plate 400, to thereby decouple the main body 100 where the camera 10 is mounted, from the plate 400.

Referring to FIG. 3, the hanger 300 may be formed of a flexible material such as fabric, silicon, or rubber.

Accordingly, the user may fold the hanger 300 and store the hanger 300 inside the plate 400 without removing the hanger 300 from the main body 100.

In the camera apparatus 1, the protrusion 150 protruding in the main body 100, specifically, the protruding main body 151, passes through the hole 310 formed in the hanger 300 such that the hanger 300 is engaged with the main body 100.

Accordingly, compared to a camera apparatus according to the related art where a main body, in which a camera is mounted, and a plate are coupled to each other by using a pin method, an additional fastening structure is included, and where two hands are needed to decouple the fastening structure, according to the camera apparatus 1 according to the present embodiment, a user may use one hand by putting a finger in the hole 310 formed in the hanger 300 and pulling the main body 100, where the camera 10 is mounted, away from the plate 400 to remove the same, thus improving convenience in terms of installation and replacement.

In addition, according to the camera apparatus of the related art using the pin method, when removing the main body where the camera is installed, from the plate, there is no component connecting a user to the main body, and thus, there is a high risk of dropping the main body where the camera is mounted. However, according to the camera apparatus 1 according to the present embodiment, as the camera 10 is coupled to the main body 100, with which the hanger 300 that is put in the hand of the user is stably engaged, the fall of the camera 10 may be prevented.

Referring to FIG. 2, the hanger 300 passes through the through hole 110 formed outside and apart from the center portion of the main body 100 to be engaged with the protrusion 150, specifically, the protruding main body 151, and protrudes out of the main body 100, and thus, the user may constantly visibly recognize the presence of the hanger 300.

Accordingly, when removing the main body 100 where the camera 10 is mounted, from the plate 400, to replace the camera 10, gripping important components of the camera 10 such as a lens may be prevented, thereby significantly reducing the probability of malfunction of the camera 10.

Referring to FIG. 3, as the hanger 300 is formed of a flexible material such as fabric, silicon, or rubber, after coupling the main body 100 to the plate 400, the user may fold the hanger 300 and store the same in a space formed inside the plate 400, thereby improving the efficient use of space and ensuring easy storage.

Hereinafter, the structure, operating principle, and effect of a photographing system according to an embodiment will be described. Referring to FIGS. 1 through 8, the photographing system according to an embodiment may include the camera apparatus 1 and the plate 400. The camera apparatus 1 is where a camera is installed and may include the main body 100, the attachment 200, and the hanger 300.

The plate 400 is fixed to the external ceiling C in position and may be coupled to the camera apparatus 1. Details of the structure, operating principle, and effect of the camera apparatus 1 including the main body 100, the attachment 200, and the hanger 300, and the plate 400 are described above, and thus, repeated detailed description thereof will be omitted.

According to the camera apparatus according to the present embodiment, configured as described above, when pulling the hanger, the main body may be easily decoupled from the plate by a relatively small force, and thus, convenience in terms of installation and replacement may be improved.

In addition, as the hanger is provided, an additional component such as a safety wire, for preventing detachment of the main body from the plate, is not required, thereby simplifying the structure of the camera apparatus.

In addition, as the hanger is provided, the possibility of gripping important components of the camera such as a lens or the like around the hanger may be reduced, thereby preventing malfunction of the camera.

It should be understood that the embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the inventive concept as defined by the following claims.

What is claimed is:

1. A camera apparatus comprising:
    a main body, on which a camera is mounted, wherein the camera is configured to capture an image of a surveillance area;
    a first attachment member coupled to the main body, and configured to be coupled to a second attachment member coupled to an external device to connect the external device to the main body; and
    a hanger in which a hole is formed, the hanger connected to the main body and configured to engage with a user, while the user is coupling the main body with the external device by coupling the first attachment member to the second attachment member, and decoupling the main body from the external device by decoupling the first attachment member from the second attachment member,
    wherein the hanger is apart from a center of the main body by a certain distance and extends outwards from an external side surface of the main body.

2. The camera apparatus of claim 1, wherein a through hole is formed on the external side surface of the main body, and
    wherein the hanger passes through the through hole to be connected to the main body.

3. The camera apparatus of claim 1, wherein the external device comprises a plate fixed in position outside and coupled to the main body,
    wherein the first attachment member is positioned on a surface of the main body facing the plate and a-the second attachment member is positioned at a surface of the plate facing the first attachment member.

4. The camera apparatus of claim 3, wherein the first attachment member and the second attachment member are coupled to each other via a magnetic force.

5. The camera apparatus of claim 4, wherein the first attachment member is positioned at a center portion of the surface of the main body, and
    wherein the second attachment member is positioned at a center portion of the plate to correspond to a position of the first attachment member.

6. The camera apparatus of claim 3, wherein the first attachment member and the second attachment member are coupled to each other via a hook and loop fastening method.

7. The camera apparatus of claim 6, wherein the first attachment member is positioned at a center portion of the surface of the main body, and
    wherein the second attachment member is positioned at a center portion of the plate to correspond to a position of the first attachment member.

8. The camera apparatus of claim 3, further comprising a cover that covers the other end of the main body facing one end of the main body, and is coupled to the plate,
    wherein the main body is coupled to the plate.

9. The camera apparatus of claim 1, wherein the camera has a dome shape.

10. The camera apparatus of claim 1, wherein the camera has a dome shape, and is configured to rotate about its own axis in the camera apparatus to capture the image of the surveillance area.

11. The camera apparatus of claim 10, wherein the first attachment member is configured to connect the main body to the external device by using a magnetic force or a hook and loop fastening method.

12. The camera apparatus of claim 11, further comprising the external device, the external device that is configured to be fixed on a ceiling.

13. The camera apparatus of claim 11, wherein the hanger comprises a first portion and a second positioned inside and outside the main body, respectively.

14. The camera apparatus of claim 1, wherein the first attachment member shares a center with the main body and is positioned at the center of the main body.

15. The camera apparatus of claim 1, wherein the camera is operated according to a signal applied from the outside, and is configured to change the surveillance area by rotating in vertical and horizontal directions.

16. The camera apparatus of claim 1, further comprising the external device, wherein an entirety of the hanger is configured to be stored within the external device while the first attachment member is coupled to the second attachment member.

17. A camera apparatus comprising:
a main body, on which a camera is mounted, wherein the camera is configured to capture an image of a surveillance area;
an attachment coupled to the main body, and configured to connect an external device to the main body; and
a hanger in which a hole is formed, the hanger being connected to the main body for coupling the main body with the external device and decoupling the main body from the external device,
wherein the hanger is apart from a center of the main body by a certain distance and extends outwards from a side surface of the main body,
wherein a through hole is formed on the side surface of the main body,
wherein the hanger passes through the through hole to be connected to the main body,
wherein a protrusion protrudes from an inner surface of the main body at an inner side of the side surface of the main body, toward the hole formed in the hanger, and
wherein the through hole is formed on the side surface of the main body.

18. The camera apparatus of claim 17, wherein the protrusion comprises:
a protruding main body positioned inside the main body and extending in one direction; and
a bent portion that is connected to one end of the protruding main body at a certain angle with an extension direction of the protruding main body.

19. A camera apparatus comprising:
a main body, on which a camera is mounted, wherein the camera is configured to capture an image of a surveillance area;
an attachment coupled to the main body, and configured to connect an external device to the main body; and
a hanger in which a hole is formed, the hanger being connected to the main body for coupling the main body with the external device and decoupling the main body from the external device,
wherein the hanger is apart from a center of the main body by a certain distance and extends outwards from a side surface of the main body,
wherein the hanger comprises a first portion and a second positioned inside and outside the main body, respectively, and
wherein the camera apparatus further comprises a protrusion protruding from an inner surface of the main body at an inner side of a side surface of the main body, and passing through the hole of the hanger at the first portion.

20. The camera apparatus of claim 19, wherein the protrusion comprises a protruding main body and a bent portion, among which the protruding main body passes through the hole of the hanger at the first portion.

* * * * *